CIPHER SYSTEM FOR PULSE CODE MODULATION COMMUNICATION SYSTEM

Filed June 19, 1946

7 Sheets-Sheet 1

INVENTOR
W. M. GOODALL
BY
William F. Simpson
ATTORNEY

Jan. 1, 1963 W. M. GOODALL 3,071,649

CIPHER SYSTEM FOR PULSE CODE MODULATION COMMUNICATION SYSTEM

Filed June 19, 1946 7 Sheets-Sheet 2

INVENTOR
W. M. GOODALL

BY William F. Simpson,

ATTORNEY

CIPHER SYSTEM FOR PULSE CODE MODULATION COMMUNICATION SYSTEM

Filed June 19, 1946 7 Sheets-Sheet 3

INVENTOR
W. M. GOODALL
BY William F. Simpson.
ATTORNEY

INVENTOR
W. M. GOODALL
BY William F. Simpson.
ATTORNEY

INVENTOR
W. M. GOODALL
BY William F. Simpson
ATTORNEY

INVENTOR
W. M. GOODALL
BY William F. Simpson.
ATTORNEY

CIPHER SYSTEM FOR PULSE CODE MODULATION COMMUNICATION SYSTEM

Filed June 19, 1946 7 Sheets-Sheet 7

INVENTOR
W. M. GOODALL
BY
William F. Simpson
ATTORNEY

United States Patent Office 3,071,649
Patented Jan. 1, 1963

3,071,649

CIPHER SYSTEM FOR PULSE CODE MODULATION COMMUNICATION SYSTEM

William M. Goodall, Oakhurst, N.J., assignor to Bell Telephone Laboratories, Incorporated, New York, N.Y., a corporation of New York Filed June 19, 1946, Ser. No. 677,663
7 Claims. (Cl. 179—1.5)

This invention relates to communication systems and more particularly to providing ciphering means and methods for rendering the signals unintelligible and secret.

Various types of communication systems are known in which the intelligence or information is transmitted by a plurality of groups of pulses each of the pulses being one of a plurality of different characters. Each group of pulses conveys a certain amount of information. Various types of equipment have been employed in the past to translate complex waves into such groups of pulses, transmitting the pulses and then regenerating the complex wave at a receiving point under control of the received groups of pulses representing the wave. Typical systems of this type are disclosed in my copending applications, Serial No. 554,495, filed September 16, 1944, now Patent 2,449,467 of September 14, 1948, and Serial No. 592,958, filed May 10, 1945, now Patent 2,438,908 of April 6, 1948. The disclosures of said applications are hereby incorporated herein by reference.

The pulses transmitted by certain of the systems in the prior art are unintelligible when received by the ordinary radio receiver or usual amplifiers employed in connection with the various types of communication paths over which such signals may be transmitted. In other cases the signals may only be recognized and understood with difficulty.

It is the object of the present invention to provide ciphering methods and automatically operating equipment controlled by the respective pulses transmitted which will render them unintelligible and secret.

In accordance with an exemplary embodiment of the present invention the signals are totally unintelligible when received on the usual types of receiving equipment. In addition they are rendered unintelligible when received by receiving equipment designed for reception of pulse code groups representing complex wave forms such as disclosed in the above-identified patent applications and made a part of the present application.

Furthermore, by frequently changing the adjustments in a manner to be described hereinafter it will be possible to render the signals unintelligible and secret even when the receiving equipment is provided in accordance with the exemplary embodiment of this invention but improperly adjusted. If the adjustments are changed often enough it may be possible to prevent unauthorized persons from securing the information transmitted over the system.

Another aspect of the invention relates to means for transmitting pulses over the system only when the pulses of the code groups change in character. Since the code groups change only in response to a change in the input signal the pulses transmitted under these circumstances represent the changes in the magnitude of the input signal instead of the magnitude of this signal. This in effect constitutes a method of transmitting the derivatives of both the input signals and of the pulse signals rather than the pulses themselves.

In still another aspect the corresponding pulses of each of the code groups of pulses may be considered a signaling channel or subchannel and in accordance with the present invention a pulse is transmitted during this time only when the character of the corresponding pulse of the code group changes.

A further object of this invention is to successively repeat the operations analogous to differentiation as often as desired.

Another object of this invention relates to methods and apparatus for receiving pulse code groups of signals which have been rendered unintelligible and reconstructing therefrom intelligible code groups of signals which may then be employed to reconstruct the complex wave represented by them.

A feature of this invention relates to transmitting signalling pulses through delay apparatus which will delay the pulse one or more pulse intervals.

Another feature of this invention relates to comparing the delayed pulses or subsequently received pulses and transmitting the pulses to a distant station under the joint control of the subsequently received pulses and the delayed pulses.

Another feature of this invention relates to pulse generating equipment which is capable of continuously generating pulses at predetermined intervals of time.

Another feature of this invention relates to equipment responsive to received pulses for initiating the operation of said pulse generating equipment.

Another feature of this invention relates to equipment responsive to received pulses for stopping the operation of said pulse generating equipment.

Another feature of this invention relates to equipment for generating a plurality of groups of pulses each of which is compared with pulses of another group.

Another feature of this invention relates to control equipment responsive to received signals for initiating and terminating the pulses of any of a group of pulses independently of the pulses of any of another group of pulses.

Another feature of this invention relates to a feedback amplifier suitable for amplifying electrical pulses of short duration including a delay device in the feedback path.

Another feature of this invention relates to control equipment for the initiation and termination of pulses transmitted through said amplifier and feedback path.

Another feature of this invention relates to the use of a delay device employing supersonic radiators, receivers and transmission media.

Another feature of this invention relates to a continuously variable delay device.

Still another feature of this invention relates to automatic control apparatus for accurately controlling the delay of certain pulses so that they may accurately coincide with received pulses.

Another feature of this invention relates to a delay device operating at a carrier frequency.

Briefly, in accordance with an exemplary embodiment of the present invention pulse code groups of signals are transmitted through a pulse delay device which delays the pulses for any desired number of pulse intervals. The delayed pulses are then compared with subsequent pulses. So long as the pulses at the comparing point are of different character a pulse of one character is transmitted. If on the other hand the pulses arriving at the comparison point are of the same character a pulse having a character different from said first-mentioned pulse is transmitted to the distant station. At the distant station the received pulses are transmitted through a comparing device to a receiving device and also through a corresponding delay device which delays the pulses the same number of pulse intervals as the delay device at the transmitting station. The pulses subsequently received at the receiving station are then compared with the delayed pulses by the comparing device and a pulse of one character transmitted when the pulses received at the comparing device are of a different character; and a pulse of a different character transmitted when the pulses received at the comparing device are of the same character. In this way the pulse code groups originally received at the transmitting station are regenerated and employed to control suitable types of pulse code receiving devices.

The number of pulse intervals which the delay devices at the two ends delay the pulses may be selected at will and may be varied at will. Persons skilled in the art understand that the more frequently and faster the number of pulse intervals the pulses are delayed is changed, the greater will be the secrecy.

In addition suitable delay devices as well as control and synchronizing apparatus are provided to improve the operation of said systems.

The foregoing as well as other objects and features of this invention, the novel features of which are specifically set forth in the claims appended hereto may be more readily understood from the following description of an exemplary system embodying the present invention when read with reference to the attached drawing in which:

FIG. 3 shows the manner in which FIGS. 4 through 9 are positioned adjacent one another; and FIGS. 4 through 9 show circuit details of an exemplary system embodying the present invention.

*General Description*

Figures 1, 2:
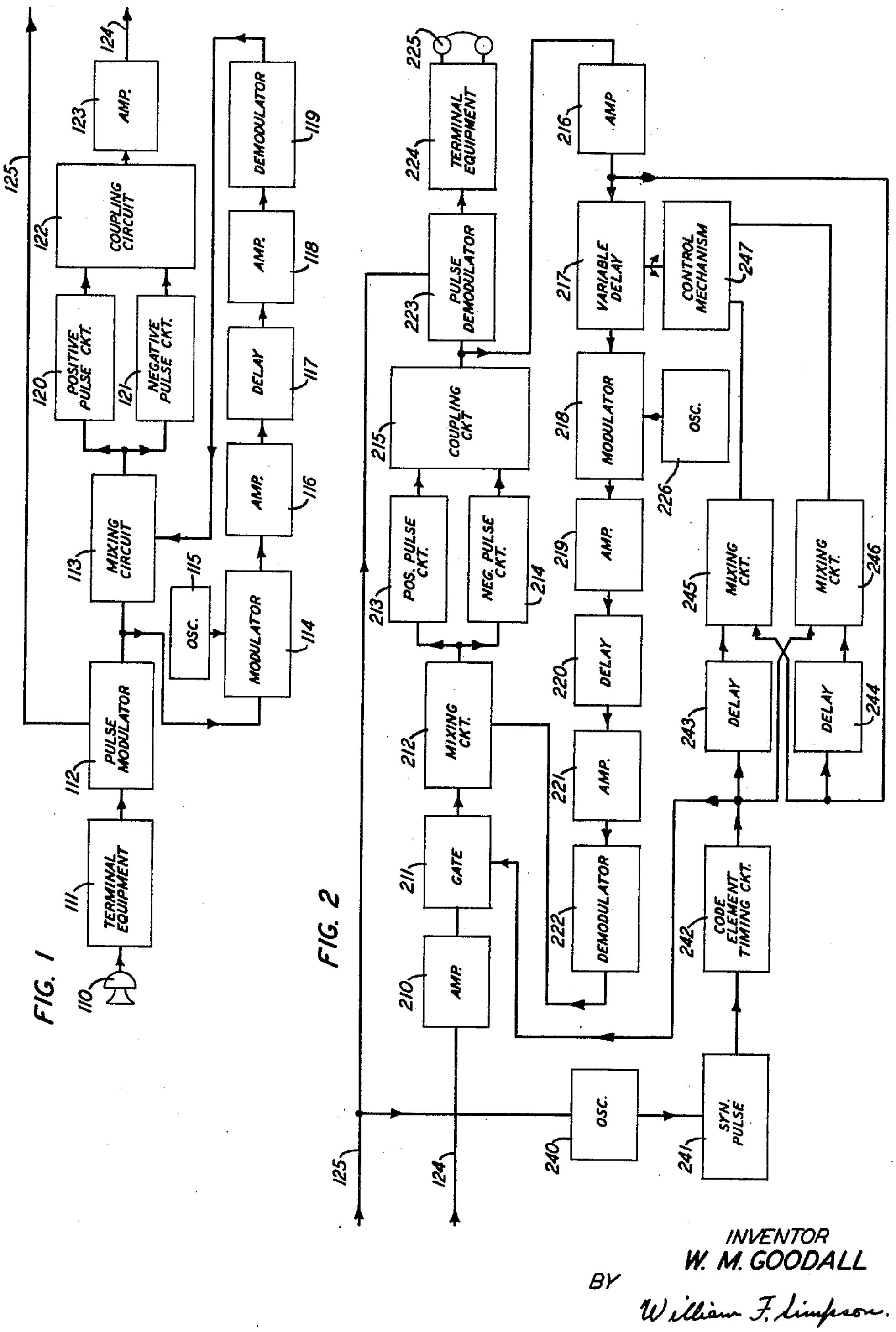
FIG. 1 shows in block form the various elements and their manner of cooperation employed in the exemplary system at the transmitting station.
FIG. 2 shows the various elements and their manner of cooperation employed in the exemplary systems at the receiving station.

FIG. 1 shows in block form the various elements at the transmitting station of an exemplary system embodying the present invention. A source of signals 110 having a complex wave form is illustrated as a microphone. A person skilled in the art, however, will understand that the device 110 shown in FIG. 1 is intended to represent any suitable source of complex wave forms such as employed in speech, broadcasting, telegraphy, television, picture transmission, mechanical vibration pick-ups, light cells, etc.

The source 110 is connected through terminal equipment 111 to a pulse modulation system 112. The terminal equipment 111 may include any suitable device or devices for transmitting, switching and interconnecting, amplifying, supervising or other types of equipment employed in communication systems for extending a communication path from a source of signals or complex wave forms to the equipment comprising the exemplary system described herein. Terminal equipment 111 may comprise a simple transmission path or it may include many switching centers, toll lines, carrier current and time division multiplex systems, radio systems, as well as various types of amplifiers, regulators, supervisory and test equipment.

The pulse modulator 112 may be of any suitable type of pulse modulation equipment which translates complex wave forms into pulses of constant amplitude. In the exemplary system described herein it is assumed that the modulating equipment 112 will translate the complex wave into a series of code groups of pulses each representing the amplitude of the complex wave at an instant of time. These code groups are generated one after another in rapid succession in accordance with the amplitude of the complex wave at successive instances of time. Typical pulse code modulation systems with which the present invention cooperates are disclosed in my copending applications referred to above.

While the circuits of the exemplary system disclosed herein, have been specifically arranged to cooperate with the pulse modulators of the above-identified copending applications, persons skilled in the art will understand that the ciphering arrangement disclosed herein will cooperate equally well with other types of systems provided, of course, the terminal connections are arranged to cooperate with the type of synchronizing employed in the various types of systems. For example, the ciphering equipment described herein will cooperate with the pulse modulation equipment in the United States Patent 2,801,281, granted to Oliver et al. July 30, 1957, without the material modification of either that patent or the present application.

As illustrated in FIGS. 1 and 2, a synchronizing channel 125 extends from the pulse modulator 112 to the receiving station. It is to be understood of course, that synchronizing signals may be transmitted over the signal path or the signals themselves used for synchronizing purposes, as is well understood by persons skilled in the art. The synchronizing path 125 has been shown merely because this furnishes the readily understood synchronizing method which is easily shown and does not complicate the disclosure of the exemplary system embodying the present invention.

The code pulse groups from the pulse modulator 112 are transmitted as positive pulses through a mixing circuit 113 and the modulating circuit 114. The pulses received during a period less than the delay of device 117, to be described later, are transmitted through the mixing circuit 113 and the positive circuit 120, coupling circuit 122 and amplifying circuit 123, and over the transmission path 124 to the distant station. The transmission of succeeding pulses from the pulse modulator 112 over the transmission path 124 to the distant station will be determined by the pulses also received at the mixing circuit 113 from the demodulator 119 as will be described hereinafter.

As stated above, the pulses from the modulator 112 are applied to a modulator 114 in addition to mixing circuit 113.

Oscillator 115 supplies a carrier current to the modulator 114 which may be of any suitable frequency, as for example, 10 megacycles. Modulated pulses are then transmitted through an amplifier 116 to a delay network or device 117. From the delay device 117 the signals are again amplified by an amplifier 118 and demodulated by the demodulator 119. The delay device 117 may be any suitable type of delay device including transmission lines or sections, artificial lines or sections, electronic delay devices such as for example, the type disclosed in United States Patent 2,245,364 granted to Riesz et al. on June 10, 1941, or they may be of a type employing supersonic waves such as disclosed in United States Patents 1,775,775 granted to Nyquist, September 16, 1930, and 2,263,902 granted to Percival November 25, 1941, the disclosures of all the above-identified patents are hereby made a part of the present application as if fully set forth herein. In the specific embodiments disclosed herein it is assumed that the delay device 117 is a supersonic device of the type referred to above which operates at a fundamental frequency of about 10 megacycles. Persons skilled in the art, however, will understand that other delay devices are the full equivalent of such delay devices and may be substituted for them without involving invention or material change in the system and circuits thereof or their mode of operation.

The delay introduced by the delay device 117 may be of any suitable or desirable length. Usually this delay will be of one or more pulse intervals or rather, will be of such a value that the pulse arriving at the mixing circuit 113 from the demodulator 119 will be delayed one or more pulse intervals after they are applied to the modulator 114. In other words the total delay through the path including modulator 114, amplifier 116, delay device 117, amplifier 118 and demodulator 119, will be the time equivalent to the time assigned to one or more pulse intervals.

As set forth in the above-identified copending applications and as is common in most pulse systems, pulses of two or more types are easily transmitted; that is pulses of two different types of current or signaling conditions such as positive current and negative current, positive current and no current, negative current and no current, or pulses of current of different magnitudes or frequencies. When only two types of pulses are transmitted, one type of pulse is called a marking pulse and the other a spacing pulse. Marking pulses are frequently referred to as current pulses or on pulses, and spacing pulses as pulses of no-current or off pulses. It sometimes happens that marking pules are represented by current pulses at one place in the system and by no-current pulses at another place in the system. Likewise, spacing pulses may be represented at certain places in the system by pulses of no current and at other places in the system by pulses of current. In order to avoid confusion in the following description the various types of pulses will be referred to as pulses of positive or negative current and pulses of no current as the case may be, it being understood that these pulses may represent either the marking or spacing pulse from the pulse modulating equipment depending upon the type of pulse modulation equipment and its mode of operation, as well as upon the definition of the terms employed to describe it and its operation. It will be further assumed that the output of the modulator 112 comprises short pulses of positive current and pulses of no current.

The first positive pulse received from the modulating equipment 112 is transmitted both through the mixing equipment and the positive pulse circuit 120 to line 124, as well as through the delay path as described above. When the delayed pulse arrives at the mixing circuit 113 it is compared with the subsequently received positive pulses from the modulator 112. The delayed pulses applied to the mixing circuit 113 are of current or no current. If the pulses applied to the demodulator 119 are of no current after being delayed by the delay device 117, pulses of no current will be applied to the mixing circuit 113. If pulses of positive current are applied to the modulator 114 then pulses of the positive or negative current could be applied to the amplifying circuit 116. However, as specifically described herein; pulses of positive current are applied to the mixing circuit 113 from the delay network when positive pulses are applied to the modulator 114. At the receiving station as will be described hereinafter, negative pulses from the delay path are applied to the mixing circuit when the original input to the mixer circuit comprises positive pulses. The mixing circuit 113 may be arranged to work in either manner as will be readily understood by persons skilled in the art.

Assuming that positive pulses are applied to the mixing circuit from the delay path when positive pulses have been previously applied to the delay path, the mixing circuit will be arranged in the following manner. When a positive pulse is applied to mixing circuit 113 both from the modulator 112 and from the demodulator 119 of the delay path a pulse of no current is transmitted from the mixing circuit. When a positive pulse is received from the delay path and a pulse of no current is received from the modulator 112, a pulse of positive current will be transmitted through the positive pulse circuit 120, the coupling circuit 122 and amplifier 123 over the transmission path 124. When a pulse of positive current is applied to the mixing circuit from the modulator 112 and a pulse of no current is applied to the mixing circuit from the delay path, a negative pulse is generated within the mixing circuit 113. This negative pulse is transmitted through the negative pulse circuit 121 wherein it is changed into a positive pulse. This positive pulse is then transmitted through the coupling circuit 122 and amplifier 123 to the transmission path 124. When pulses of no current are applied from both the modulator 112 and the delay path, the output of the mixing circuit 113 will also be a pulse of no current.

The above-described operation of the circuits then continues, so long as pulses are received from the modulator 112. At the termination of the reception of pulses from the modulator 112 the pulses previously applied to the delay line will be transmitted in the manner described after which no further pulses will be transmitted over the system until additional pulses are received from the modulator 112.

As pointed out above the delay interval around the delay loop may be of any number of pulse intervals. Furthermore, the delay device 117 may be arranged so that the number of delay intervals around the delay loop may be readily and rapidly changed from one value to another so that further privacy and secrecy may be attained when it is so desired.

In addition, if the delay interval is suitably chosen the pulses transmitted over the signaling path 124 represent the effective derivative of the signaling condition output from the modulator 112. For example, if the delay interval of the delay device 117 is only one pulse interval, then so long as the signaling condition output from the modulator 112 remains the same, that is, either a series of positive current pulses or a series of no-current pulses, no pulses will be transmitted over the signaling conductor. Upon a change of the output of the modulator 112 from one signaling condition to the other, a single pulse of current will be transmitted over the signaling path 124. For example, assume that no pulses (that is, pulses of no current) are received from the pulse modulator 112 for an interval of time so that no pulses will be in the process of being transmitted through any of the circuits at the transmitting station, and that condition is followed by a series of positive current pulses being received from the pulse modulator 112. The first of these positive current pulses will be transmitted through the mixing equipment 113 and the positive pulse circuit because no pulse will be received at this time from the modulator 119. This first pulse is also transmitted through the delay path comprising the delay device 117 and it will arrive at the mixing circuit at the same time as the second positive current pulse from the modulator 112. Due to the operation of the mixing circuit as described above, such a condition results in the transmission of a pulse of no current. The above-described operations are then repeated for each succeeding pulse of current received from the pulse modulator 112 assuming, of course, that no pulses of no current are interposed between pulses of current. However, when the output of the modulator 112 changes and a pulse of no current is received following the series of pulses of current, this pulse of no current together with a pulse of current from the delay path will cause the mixing circuit 113 to transmit a negative pulse to the negative pulse circuit 121, resulting in a positive pulse through coupling circuit 122 and amplifier 123 to line 124.

In other words pulses are transmitted over the transmission path only when the output from the modulator 112 changes from one of the two possible signaling conditions to the other. Such arrangements are sometimes described as operating to transmit the signals under control of the derivative of the signaling condition output from the pulse modulator.

A second special condition should be noted when the delay interval of the delay device 117 delays the signals by the time interval equal to the number of pulse intervals in a complete code group of pulses. If each code group of pulses comprises six pulses and if the delay interval of the delay device 117 is equal to six pulse intervals then the pulses of one code group are compared by the mixing circuit with the corresponding pulses of the succeeding code group. In other words the first pulse of one code group will be compared with the first pulse of the second code group, etc.

Under these conditions no pulses (or pulses of no current) are transmitted as long as the code combinations received from the pulse modulator remain unchanged. Now, the code combinations from the pulse modulator will remain unchanged so long as the signal or complex wave input thereto remains unchanged. When the input signal changes, the code combination from the pulse modulator changes. Consequently, pulses or code combinations representing or incident to the change of the input signal are sent over the transmission path. In other words the pulses sent over the transmission path indicate the change in the signal or complex wave input instead of the wave itself; i.e., they are in effect the derivative of the wave instead of the wave itself.

In addition, if each of the pulses of the code groups are considered as comprising an individual and independent signaling path or subchannel and if each of the code groups comprises six pulses as assumed above, the transmission path may be considered as including six separate subchannels operated on a time division basis, the first pulse of each code group comprising one subchannel, the second pulse of each code group comprising a second subchannel, etc.

If the delay interval of the delay device 117 is equivalent to the time of a complete code group as assumed above, then the system may be described as transmitting signals over the respective subchannels only when the signaling condition in those subchannels changes. In other words, the delay path and the associated equipment operate as apparatus for taking the derivative of the individual subchannels instead of the derivative for all subchannels as described above when the delay was equal to only one pulse interval. With this arrangement there is always stored in the delay path a group of pulses which are compared with the corresponding pulses of the succeeding code groups.

While the system operates as a means for taking the derivative of signals under the two special conditions pointed out above, persons skilled in the art will readily understand that the delay device 117 may delay the signals any desirable number of pulse intervals from one to a large number.

As is clearly evidenced from the above description the signals transmitted over the transmission path 124 are entirely different from the signals received from the modulator 112. Consequently, signals transmitted over the transmission path 124 are totally unintelligible when received on an ordinary receiver and also when received by means of pulse code demodulators of the types described in the above-identified copending applications forming a part of the present disclosure.

In order to render the signals intelligible it is necessary to reconvert them into signals similar to those received from the pulse code modulator 112.

Suitable equipment for accomplishing this is shown in FIG. 2.

The signals are transmitted from FIG. 1 to FIG. 2 over the signal transmission path 124. As pointed out in the above-identified copending applications this transmission path is shown as a single line or conductor in FIGS. 1 and 2. Persons skilled in the art, however, will readily understand that this line or conductor respresents any suitable type of signaling path including a single conductor with group return, a pair of conductors either open wire or in a cable, a coaxial cable, a wave guide, or a radio channel including the extremely high frequency region sometimes referred to as the microwave region where the waves exhibit quasi-optical properties. The path may include suitable types of repeater, amplifier and regulator equipment which operate in their usual manner and are capable of transmitting and relaying pulses of current from the transmitting station to the receiving station. As pointed out above a second channel 125 extends between the two stations and is employed for synchronizing purposes. As indicated elsewhere herein this channel may be replaced by suitable equipment operating over the signaling channel or under control of the signals themselves in accordance with known systems for maintaining synchronism between transmitting and receiving stations.

The local oscillator 240 is controlled by the signals received over the synchronizing channel 125 and oscillator 240 in turn controls a synchronous pulse generator which generates the pulses for each code combination of signals. The synchronous pulse generator 241 in turn controls a code element timing circuit which generates a pulse for each pulse interval of the received pulses.

As is well understood by persons skilled in the art oscillator 240 may be dispensed with and the synchronous pulse generator 241 controlled directly over the synchronizing channel. However, by providing oscillator 240 and designing oscillator 240 to have a high degree of stability it is possible for the synchronizing channel to become interrupted for an appreciable period of time without interfering with the operation of the system.

The signals received from the transmitting station over the transmission path 124 pass through amplifier 210 which may be of any suitable type and design and then through a gate circuit 211. The gate circuit 211 is employed to reduce the effects of static and other stray interfering currents and pulses. The gate circuit is designed to prevent the transmission of signals through it except when a gating pulse is applied to it from the code element timing circuit 242.

The code element timing circuit applies a gating pulse to the gating circuit 211 during each pulse interval thus permitting the most desirable portion of each pulse to be selected and transmitted to a mixing circuit 212. By eliminating a large proportion of the pulse interval and selecting only a small portion thereof the effect of stray and disturbing currents and pulses is greatly reduced thus materially improving the signal-to-noise ratio of the system.

The mixing circuit 212 operates similar to the mixing circuit 113 at the transmitting station. The specific details of these two circuits as shown and described hereinafter are somewhat different. However, these circuits accomplish similar results and may be used interchangeably.

For the purpose of illustration it will be assumed that signals comprising pulses of positive current and no current are received from the gating circuit 211, and applied to the mixing circuit 212. The pulse applied to the mixing circuit 212 from the gating circuit 211 are transmitted through the mixing circuit 212 unless prevented by pulses received from the demodulator 222 as will be described hereinafter.

The first positive pulse received by the mixing circuit 212 will cause the production of a negative pulse in the output. This will be transmitted through the negative pulse circuit 214 to the coupling circuit 215. From the coupling circuit the resultant pulse is transmitted both to a pulse demodulator 223 and also around a delay loop comprising an amplifier 216, a variable delay device 217, a modulator 218, amplifier 219, delay device 220, amplifier 221 and demodulator 222.

Except for the variable delay device 217 the delay loop at the receiving station is similar to the delay loop at the transmitting station and may include similar types of equipment or other equivalent types of delay apparatus.

Due to factors which will be explained hereinafter it is desirable to have an adjustable delay device in the delay loop. This adjustable delay device may be included in the main delay device 220 or it may comprise an auxiliary delay device 217 as shown in FIG. 2. The main delay device 220, FIG. 2, is similar to the delay device 117 at the transmitting station in the exemplary system embodying the invention described herein. Thus the negative pulse from the coupling circuit 215 is transmitted through the amplifier 216, variable delay device 217, to modulator 218 where it modulates a carrier frequency supplied by oscillator 226. The modulated carrier frequency is then amplified by amplifier 219 and transmitted through the delay device 220 after which the delayed pulses are again amplified by amplifier 221 and demodulated by demodulator 222 and applied to the mixing circuit 212.

As pointed out hereinbefore the application of a positive pulse from the gate 211 to the input of the mixing circuit 212 causes a negative pulse to be applied to the other input of mixing circuit 212 upon the termination of the delay interval of the delay loop. Application of a pulse of no current to the delay loop from the coupling network 215 will cause no current pulses, or pulses of no current, to be applied to the mixing circuit 212 at the termination of the delay interval around the delay loop.

As pointed out hereinbefore the delay loop and mixing circuit may be arranged as described above at the transmitting station, or the delay loop and mixing circuit at the transmitting station may be designed and operated in a manner described for the corresponding equipment at the receiving station.

If a pulse of no current is applied to the mixing circuit from the gating circuit 211 simultaneously with a pulse of no current from the delay loop through demodulator 222, a pulse of no current will be received from the mixing circuit 212. If a positive pulse from the gating circuit 211 and a negative pulse from the demodulator 222 are simultaneously applied to the mixing circuit 212, a pulse of no current will be transmitted from the mixing circuit. In other words these two pulses neutralize each other in the mixing circuit. If however, a positive pulse is applied to the mixing circuit 212 by gating circut 211 at a time when no pulse is received from demodulator 222, a negative pulse is transmitted through the mixing circuit 212, negative pulse circuit 214, coupling circuit 215 and then both to the delay loop and the pulse demodulator 223. Likewise, when no pulse is received from the gating circuit 211 at a time during which a negative current pulse is received from demodulator 222, the mixing circuit 212 causes a positive pulse to be transmitted to the positive pulse circuit 213. The positive pulse circuit 213 converts the positive pulse into a negative pulse and transmits it through the coupling circuit 215 to pulse demodulator 223 and also around the delay loop.

The operation of the system at the receiving station may be more readily understood from a description of the action of the circuits in response to received signals. Assuming as described hereinbefore that the pulse modulator 112 is continuously supplying a plurality of pulses of positive current without any off pulses or pulses of no current between any of the pulses of positive current. Under these circumstances as described above a single pulse will be transmitted over the transmission path 124 to the receiving station. No further pulse will then be transmitted until a pulse of no current is received from the pulse modulator 112 at the transmitting station. This time a second pulse will be transmitted over the transmission path 124. The above-described operation assumes that the delay interval of the delay device 117 at the transmitting station delays the pulse around the delay loop only one pulse interval.

Under these circumstances the combined delay interval of the delay device 220 and the variable delay device 217 will be such that the delay interval around the delay loop at the receiving station will also be one pulse interval.

When a single pulse of current is received over conductor 124 it will be transmitted through the amplifier 210, gate device 211, mixing circuit 212, positive pulse circuit 213, coupling circuit 215 to the pulse demodulator 223. In addition this first pulse is transmitted around the delay loop comprising amplifier 216, variable delay device 217, modulator 218, amplifier 219, delay device 220, amplifier 221 and demodulator 222. The delayed pulse will then be applied to the mixing circuit 212. As pointed out above this pulse will be a pulse of negative current. Inasmuch as under the assumed conditions no pulse will be received by the mixing circuit 212 from the gating circuit 211 at this time, a negative pulse will be transmitted by the mixing circuit through negative pulse circuit where it is changed into a positive pulse which is then transmitted through the coupling circuit 215 to the pulse demodulator 223 thus forming a second pulse in the pulse interval immediately following the first pulse described above.

The second pulse is likewise transmitted around the delay loop in the manner described above and if no pulse is received over conductor 124 at this time this pulse will also be transmitted through the mixing circuit 212, negative pulse circuit 214, coupling circuit 215 to the pulse demodulator 223. The above action continues until a pulse of current is received over conductor 124. When a pulse from line 124 together with the negative pulse received around the delay loop are substantially simultaneously applied to the mixing circuit 212 they may be thought of as neutralizing each other so that no pulse will be transmitted to the pulse demodulator or around the delay loop until another pulse of current is received over the incoming channel 124. In this manner each of the pulses canceled out of the signal received from the pulse modulator 112 at the transmitting station is reinserted and supplied to the pulse demodulator 223 at the receiving station. Consequently, the series of code pulses received from the pulse modulator 112 at the transmitting station is reconstructed and supplied to the pulse demodulator 223 at the receiving station.

If it is assumed that the delay interval of the delay device at both ends of the system delay the pulse around the delay loop by an interval of time equal to two pulse intervals, then when a series of consecutive positive current pulses are received from the modulator 112 two consecutive positive pulses are transmitted over the transmission path 124. Thereafter no further pulses will be transmitted over the transmission path until the supply of positive pulses from the pulse modulator 112 is interrupted. When no further positive pulses are received thereafter for an interval of time, two more positive pulses will be transmitted over the transmission path to the receiving station.

At the receiving station the first two positive pulses when received will be transmitted to the pulse demodulator equipment 223 and also around the delay loop. Under these circumstances two pulses will always be in process of being transmitted around the delay loop.

So long as no further pulses are received over the transmission path 124 these pulses will be transmitted around the delay loop and also to the pulse demodulator 223. When it is desired to interrupt the supply of pulses to the pulse demodulator, two pulses will be received over the transmission path as described above. The first of these two pulses will cancel one of the pulses being transmitted around the delay loop and the second will cancel the other pulse being transmitted around the delay loop.

Of course, if pulses are received in any other combination, as for example, pulses of current and no current, then the pulses of current and no current will be transmitted around the delay loop at the transmitting station in proper sequence to cause pulses to be supplied to the demodulator 223 corresponding to the pulses received from the pulse modulator 112 at the transmitting station.

The number of pulse intervals by which the pulses are delayed around the delay loop corresponds to the number of pulses which may be simultaneously transmitted around the loop. In addition it is necessary for a pulse to be received before it is transmitted around the loop and thereafter the pulse will be continuously transmitted around the loop until another pulse is received to cancel the pulse being transmitted around the loop.

The delay loop and the associated equipment at each end of the system may be considered to be a stable feedback pulse amplifier or pulse oscillator which when started into operation by the application of a pulse will continue in operation until the pulse is removed therefrom by the application of a pulse of opposite or different character thereto.

As pointed out above when the delay interval is a single pulse interval the equipment at the transmitting station operates in a manner somewhat analogous to taking the derivative of the pulses supplied by the pulse modulator 112. Similarly, under the same circumstances the equipment at the receiving station under the same set of conditions operates in a manner somewhat analogous to an integrating arrangement whereby the original pulses are obtained from their derivatives received from the transmitting station.

Likewise, when the delay interval around the delay loop is equivalent to a complete pulse code group the equipment at the transmitting station operates in a manner somewhat analogous to taking the derivative of the pulses in each of the subchannels. The equipment at the receiving station may be thought of as integrating equipment for integrating the derivative or received pulses, whereby the original series of code groups of pulses is obtained for each of the subchannels.

As will be readily understood by persons skilled in the art it is only necessary to change the delay interval at both ends of the system in accordance with any predetermined plan or schedule in order to make the reception of the signals by similar equipment but not operated in accordance with the plan or schedule, difficult if not altogether impossible. Of course, the more frequently the delay interval is changed and the wider choice of delay intervals available the greater the degree of security of the communications transmitted over the system.

There may be intervals of time of appreciable length during which pulses are being transmitted around the delay loop at the receiving station. At the end of this time it is necessary that the final pulse or pulses coincide with subsequently received pulses rather accurately in order that the mixing circuit 212 may properly respond to the pulses and cause their cancellation. Furthermore, any small error in the time delay around the delay loop at the receiving station will be additive. That is the error is accumulative and is added for each journey around the loop. Assume, for example, that the system is operating with a delay interval of a single pulse interval and that the delay time around the loop at the receiving end is only $\frac{1}{100}$ of a pulse interval different from the rate of arrival of pulses. By the time the pulse has gone around the loop ten times it will be either $\frac{1}{10}$ of a pulse interval too early or too late. By the time the pulse has gone around the loop 100 times it will be either a whole pulse interval too early or too late thus causing a pulse to be added or lost.

In order to more accurately control the delay interval around the delay loop at the receiving station and thus prevent the above-described type of improper operation of the system a variable delay network or other type of delay device is provided in the delay loop and designated 217 in FIG. 2. This variable delay device is arranged to be controlled by a control mechanism 247 so that the delay of the variable delay device 217 may be either increased or decreased by the desired amount. The control mechanism 247 is controlled by two mixing circuits 245 and 246 to which are applied the pulses being transmitted around the delay loop after they are transmitted through amplifier 216. In addition the code element timing circuit supplies pulses to these mixing circuits.

The code element timing pulses before being applied to the mixing circuit 245 are delayed by a time interval approximately equal to ½ the pulse length. The pulses being transmitted around the delay loop before they are applied to the mixing circuit 246 are likewise delayed by approximately an interval of time equal to ½ the pulse length. Thus if the pulse from amplifier 216 is accurately synchronized with the pulse from the code element timing circuit, the output of the two mixer circuits will be substantially equal and neutralize each other in the control mechanism 247. If the pulse being transmitted around the delay loop is a little bit late when compared with the code element timing pulse the output of one of the mixing circuits will increase and the other decrease and causes a change to be made in the variable delay device 217 to reduce the delay. Conversely, if the pulse received from the delay loop has not been delayed enough the output of the other mixing circuit will increase while the output of the first mixing circuit decreases and thus causes the opposite change to be made in the variable delay device and thus cause the pulse transmitted around the delay device to be accurately maintained in synchronism with received signals so that when a succeeding signal is received the pulses being transmitted around the delay loop will accurately coincide in time with the received pulses.

The pulse demodulator 223 is arranged to receive the reconstructed and deciphered code groups of pulse and reconstruct the complex wave therefrom in a manner similar to that described in any of the above-identified copending applications. The reconstructed wave from the pulse demodulator 223 is then transmitted through terminal equipment to a receiving device 225. Terminal equipment 224 may include any or all of the types of equipment referred to hereinbefore with respect to terminal equipment 211. Likewise the receiving device 225 may be any suitable type of receiving structure or device which is capable of responding to the complex waves transmitted from the source 110.

*Enciphering Equipment*

Figures 3, 4:
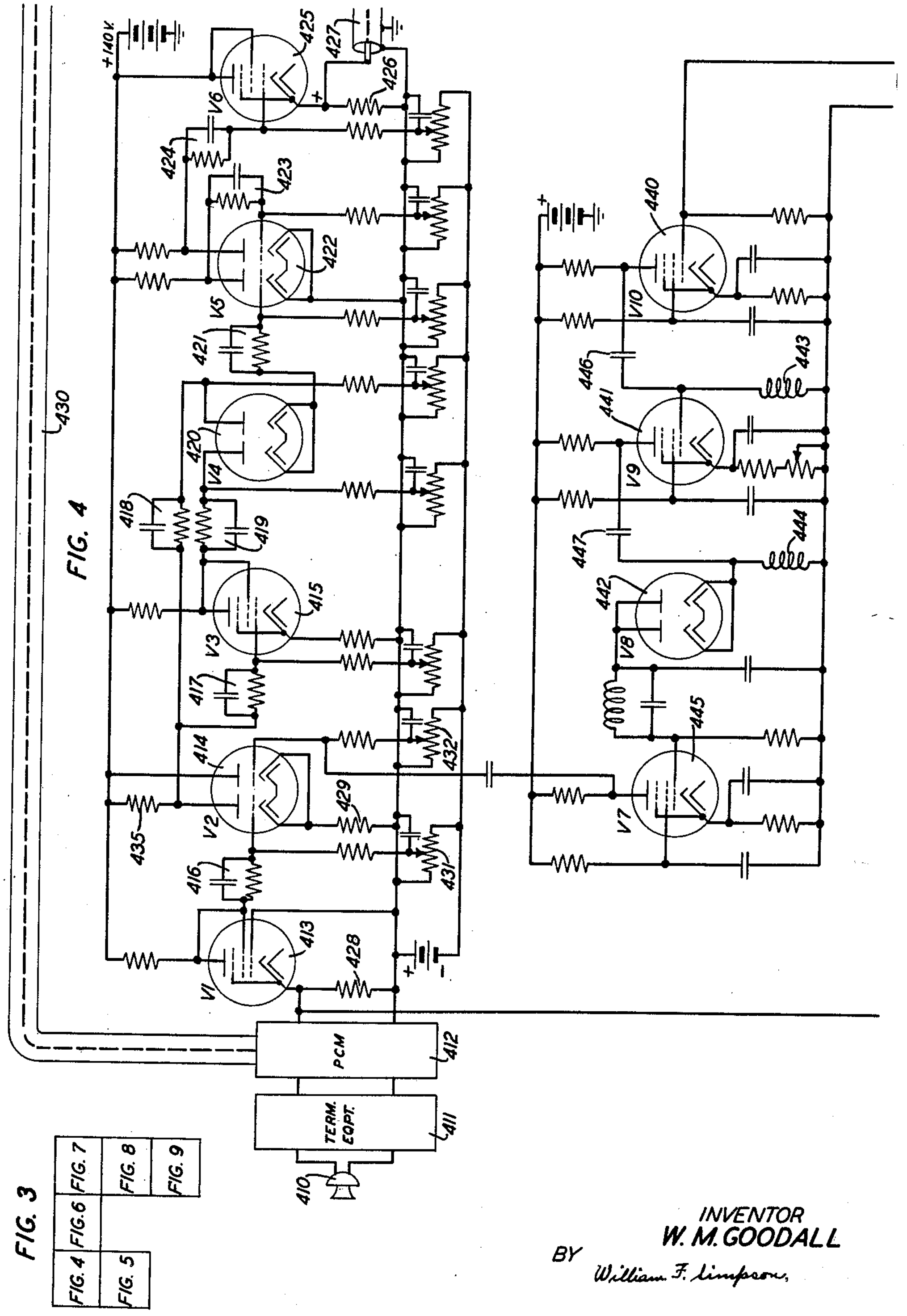
Figure 5:
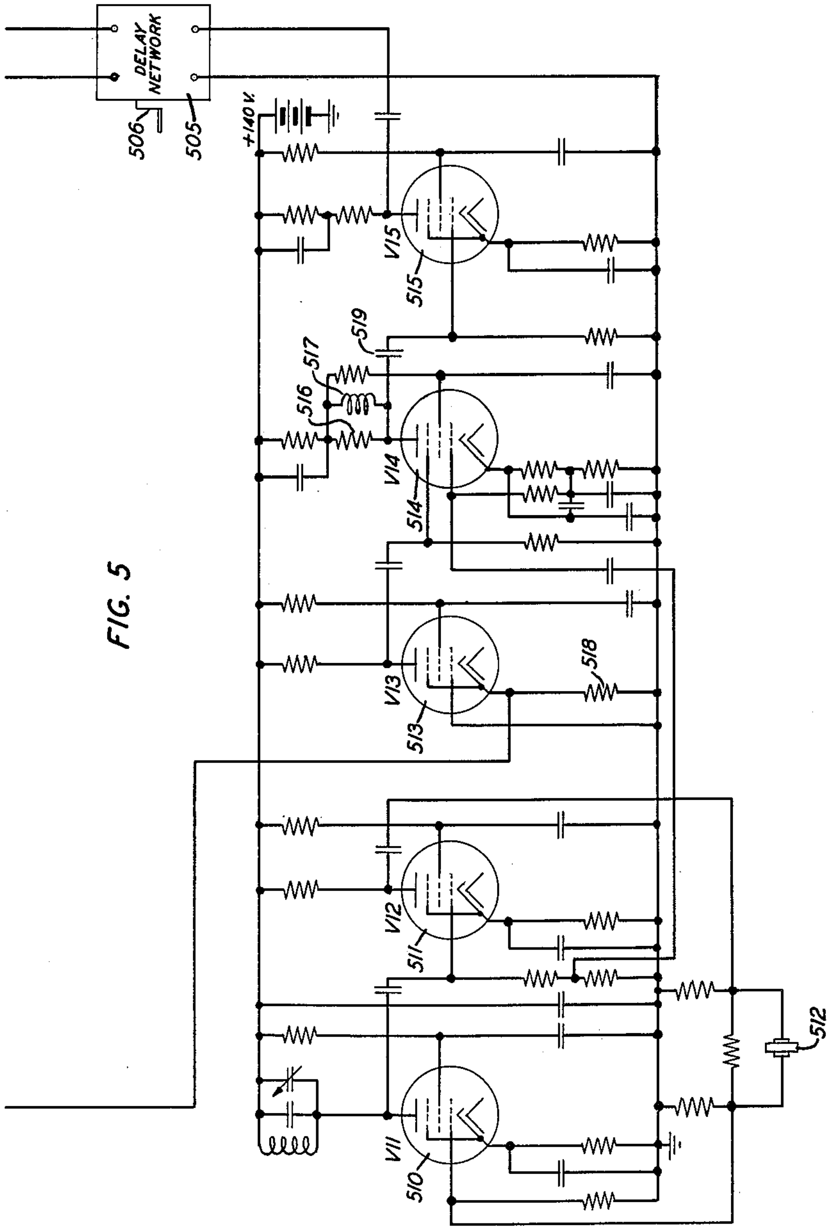
Figure 6:
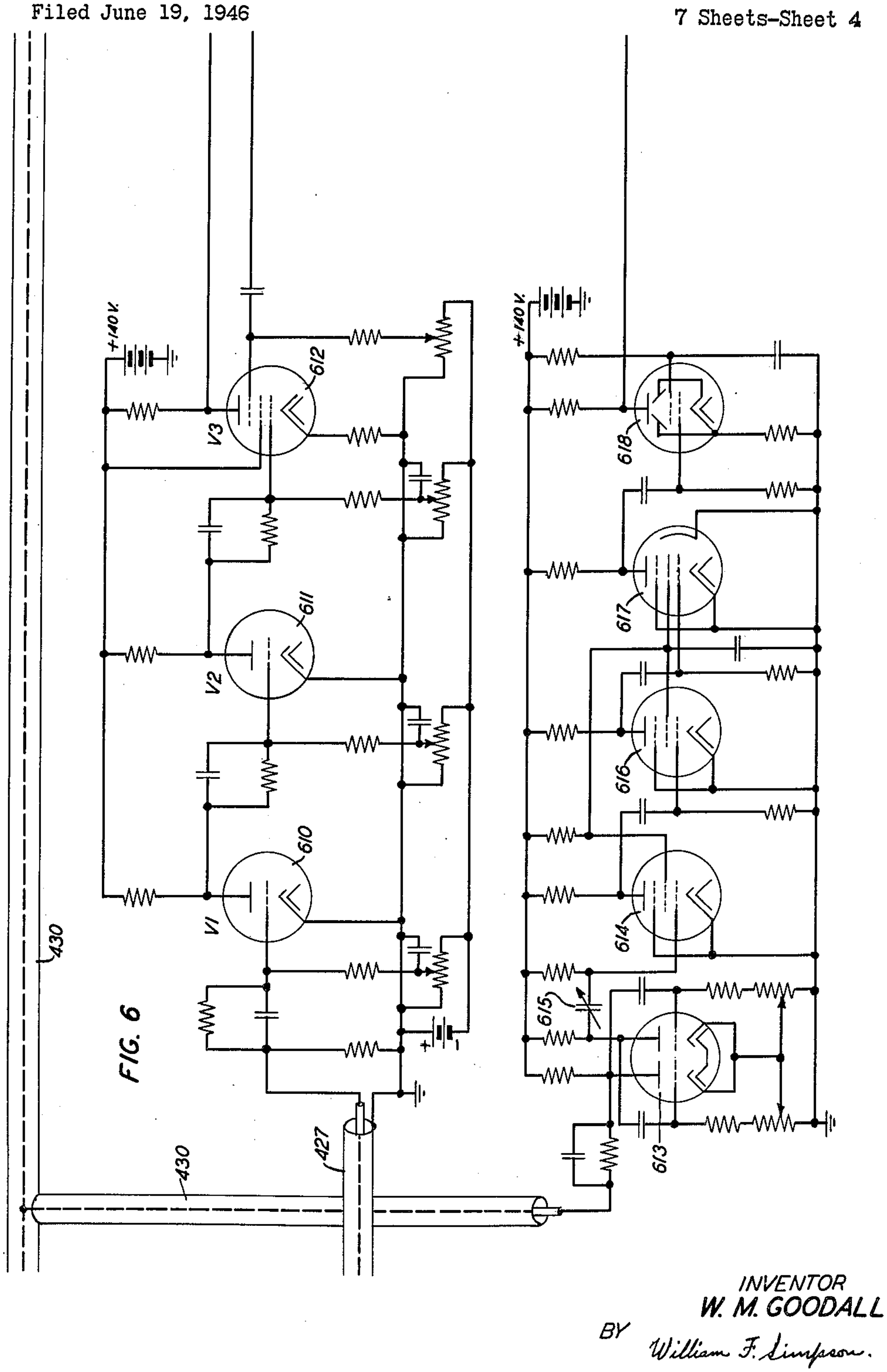
Figure 7:
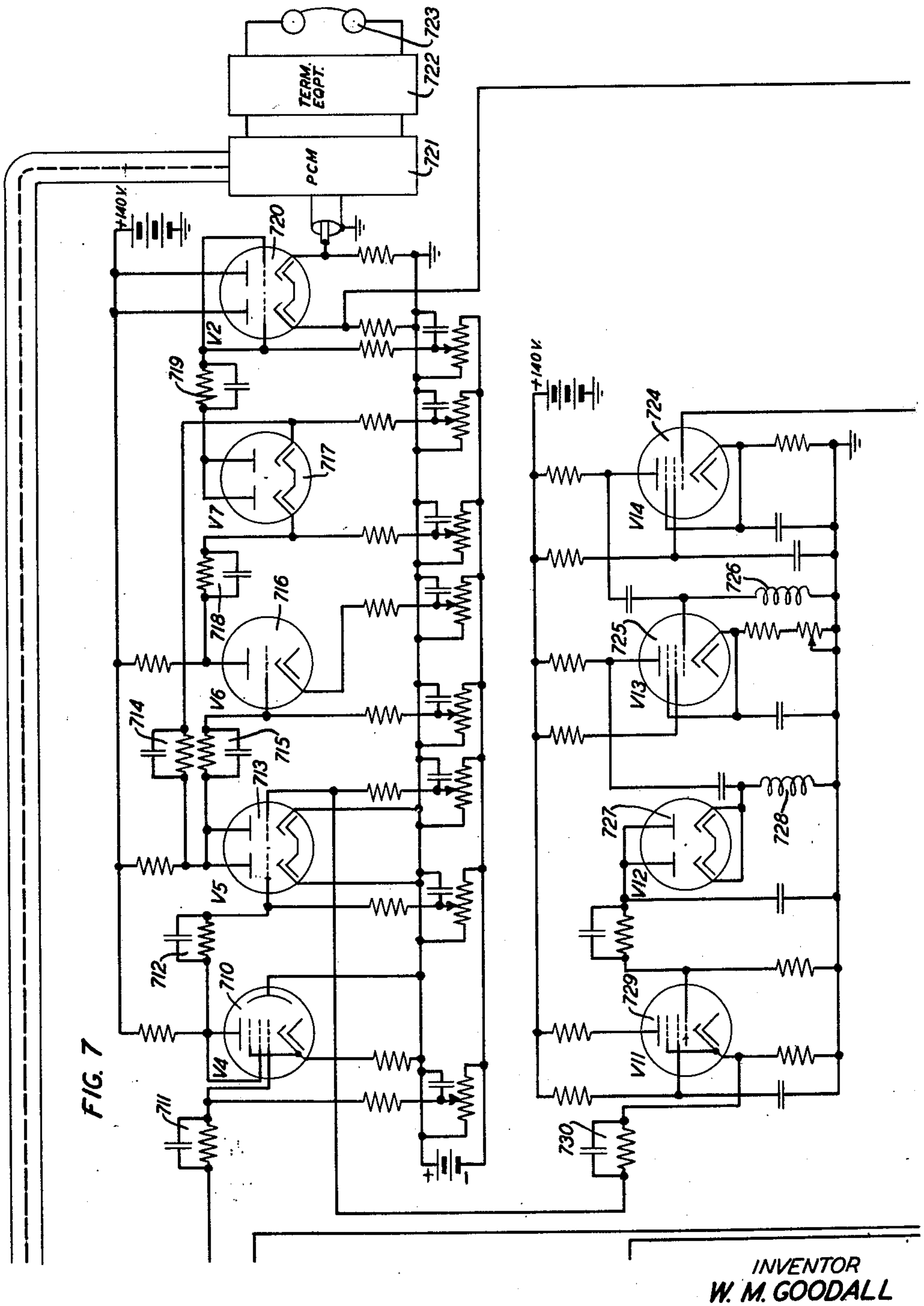

Turning now to the detailed showing of the exemplary embodiment of the invention shown in FIGS. 4 through 9 as arranged as shown in FIG. 3, FIGS. 4 and 5 show the details of the enciphering equipment. The reference numeral 410 designates a source of complex wave which is shown as a microphone. This microphone is intended to represent any suitable source of complex waves as described above. The source 410 is connected through the terminal equipment 411 to a pulse code modulation system of any suitable type which converts the complex wave form into permutation code groups of pulses, each group of which comprises a fixed number of pulses and each pulse of which comprises any one of a plurality of signalling conditions. In a pulse code modulation system of the type refered to above, a complex wave is represented by permutation code groups each of a number of pulses of two different signalling conditions. These code groups are sometimes called binary code groups and they may be arranged in the form of corresponding binary numbers representing the instantaneous amplitude of the complex wave form at recurring intervals of time.

The output of the code modulation system 412 is applied to vaccum tubes 413 and 513. These tubes both operate as grounded grid amplifiers and serve to amplify the permutation code groups of pulses received from the pulse modulation system 412 with no change in polarity.

The output of tube 513 is coupled to one of the control elements of a mixer or modulating tube 514. Another control element of tube 514 is connected to a source of high frequency carrier current generated by a crystal controlled oscillator comprising tubes 510 and 511 and crystal 512.

Tubes 510, 511 and crystal 512 are intended to illustrate the details of a typical type of oscillator suitable for generating the necessary high frequency carrier current. Persons skilled in the art will, of course, appreciate that any other oscillator circuit capable of supplying the desired carrier current may be employed. The frequency of the carrier current need not be in any way related to the frequency of any of the pulses, or their harmonics, of the pulse code modulation system. In an exemplary system the frequency of the carrier current may be of the order of 10 megacycles. The mixing tube 514 is coupled through the network comprising inductor 517, resistor 516 and capacitor 519 to the amplifier tube 515. The inductor 517 is employed to at least in part resonate with the capacity of the output circuit of tube 514 and the input circuit of tube 515 as well as the distributed capacity of the wiring. Resistor 516 is employed to broaden the resonance curve of inductance 517 and the capacities mentioned above.

Tube 515 serves as an amplifier tube for amplifying the carrier current modulated in accordance with the pulses received from the pulse code modulated systems. The output of the amplifier tube 515 is connected to a delay network or device 505 which is arranged to delay the modulated carrier current pulses by any desired interval of time. The delay interval of this device may be readily changed in any suitable manner, as for example, by crank 506, rotation of which will vary the transmission path length and thus the delay interval.

For purposes of illustration let us first assume that the delay interval of the delay device 505 is equivalent to the time required to transmit a complete permutation code combination received from the pulse code modulation system 412.

The delay network or device 505 may be of any suitable type which provides the necessary delay. Typical examples of suitable types of delay devices or networks are pointed out above.

The output of the delay network 505 is coupled through amplifier tubes 440 and 441 in cascade. Coupling between the amplifier tubes comprises condenser 446 and an inductance 443 and condenser 447 and inductance 444, respectively. The inductances are employed to resonate the input capacity as well as the stray capacity of the wiring and the output capacity of the previous tube.

Tube 442 is employed to demodulate the carrier current and secure delayed pulses similar to the pulses received from the pulse modulator equipment 412.

Of course the carrier oscillator comprising tubes 510 and 511 and crystal 512 may be dispensed with if a suitable delay device 516 is employed which will transmit the pulses received from the pulse code modulation system 412 without excessive distortion.

The pulse output from the demodulator tube 442 will be of either negative current corresponding to carrier current received from the delay device or of no current. For purposes of illustration let us assume that the pulses of negative current correspond to positive pulses received from the pulse code modulation system 412. The pulses in the output from tube 442 are amplified and inverted by tube 445. That is, it converts the negative pulses in the output from tube 442 to positive pulses which are applied to the right-hand grid of tube 414.

The output of the amplifier tube 413 is connected through to the coupling network 416 to the left-hand grid of tube 414. Since tube 413 is operated as a grounded grid amplifier the pulses applied to tube 414 are of the same positive polarity as those received from the modulator 412.

Tube 414 is a mixing tube and is arranged to transmit pulses when a positive pulse is applied either to the grid of the right-hand section, or when a positive pulse is applied to the grid of the left-hand section, but will not transmit any pulse either when no positive pulses are applied to either of the grids or when positive pulses are applied substantially simultaneously to both of the grids.

The cathodes of both the right-hand section and left-hand section of tube 414 are connected together and to the cathode resistor 429. The two sections of tube 414 are normally biased by means of the cathode resistor 429 as well as the respective potentiometers 431 and 432 so that the left-hand section of this tube passes a current of about one-half its maximum current rating or one-half of its saturation current, while the right-hand section passes a smaller current. Then upon the application of a positive pulse to the grid of the left-hand section without the application of a positive pulse to the grid of the right-hand section, the current through the left-hand section increases and that through the right-hand section decreases due to the effect of the cathode resistor 429. The increase of current flowing through the left-hand section will produce a greater potential drop across the anode resistor 435 and thus cause a negative pulse to be applied to the control element of tube 415. Tube 415 serves to amplify and invert the negative pulse from the left-hand section of tube 414 and apply a positive pulse through the coupling network 419 to the anode of the left-hand diode of tube 420.

If a positive pulse is applied to the grid of the right-hand section of tube 414 without the application of a positive pulse to the grid of the left-hand section of this tube, current will increase in the right-hand section of the tube and decrease in the left-hand section due to the action of the common cathode resistor 429. In other words the increase of current through the right-hand section will increase the potential drop across resistors 429, which in turn tends to make the cathodes of both sections of this tube more positive. Inasmuch as the cathode of the left-hand section becomes more positive while the grid potential remains substantially the same, the effective negative bias of the grid is increased. Consequently the current flowing in the output or anode circuit of the left-hand section is decreased. With a decreased anode current flowing in the left-hand section of tube 414 the potential drop across the anode resistor 435 is decreased resulting in a positive pulse which is applied through the coupling network 418 to the right-hand anode of the coupling tube 420.

If, however, a positive pulse is applied to both of the grids of tube 414 substantially simultaneously, then the cathodes of both of these tubes rise. Under these conditions the change in current through the anode resistor 435 is quite small in comparison to the other changes described above. Consequently, substantially no pulse will be transmitted from tube 414 at this time.

Thus the application of a positive pulse to either grid of tube 414 causes a positive pulse to be applied to one or the other anodes of the coupling tube 420 and in turn causes a positive pulse to be applied to the control grid of the left-hand section of tube 422. Tube 422 functions to amplify the positive pulse applied to this grid and repeat them to the output amplifier tube 425. The amplifier tube 425 in turn transmits the pulses over the transmission path 427 to the distant end.

It is thus apparent that pulses are transmitted over transmission path 427 in response to the application of a pulse to either of the grids of tube 414 but not to the application of a positive pulse substantially simultaneously to both of these grids.

With the delay network 505 set for the time of a complete code combination, the first pulse of each code combination is compared with the first pulse of the preceding code combination. Likewise the second pulse of each code combination is compared with the second pulse of the preceding code combination and so on for each of the pulses of the code combinations. Pulses will be transmitted only when these two pulses are of different character. However, the same type of pulse will be transmitted independently of which way the difference is.

If the delay network 505 is set for some other value as pointed out above, then other pulses will be compared one with another and pulses will be transmitted only when the compared pulses are dissimilar.

*Transmission*

Pulses to be transmitted are applied to the grid of the left-hand section of tube 422. The output of this section of the tube is connected to the input of the right-hand section which in turn is connected to the input of the output or power tube 425. As shown in FIG. 4, the output from tube 425 is obtained from across the cathode resistor 426 which is connected to the coaxial cable 427. It will be understood that the invention is not limited to transmission of signals over a coaxial cable 427. Instead cable 427 is intended merely to represent one suitable type of transmission path extending from the transmission station shown in FIG. 4 to the receiving equipment shown in FIGS. 6 through 9, inclusive. This transmission path may also include wave guides, radio circuits including extremely high frequency radio channels sometimes called microwaves having such short wavelength that they are sometimes called quasioptical waves because they exhibit some of the properties of light waves.

In addition to the transmission path 427, a second or synchronizing path 430 is shown extending from the pulse code modulation equipment 412 to the receiving equipment. Persons skilled in the art will understand that, when desirable or necessary this second path may be dispensed with when and if suitable synchronizing equipment is provided which operates over the main signalling path or is controlled by the signalling impulses themselves. It will also be evident to persons skilled in the art that the same type of transmission channel may be employed for transmission path 430 as is employed for the transmission of the signalling pulses designated 427. However, it is not at all essential that these two paths be the same or even of a similar type of transmission path.

*Deciphering Equipment*

The signals are transmitted over the transmission path 427 to the deciphering equipment at or near the receiving station where the signals are deciphered and then transmitted through the pulse code demodulation equipment 721. The signals are then transmitted to terminal equipment 722 to a suitable type of receiving device 723. In passing through the demodulation equipment shown in FIGS. 6, 7, 8 and 9, the signals are restored to the same permutation code groups as originally transmitted from the pulse code modulation equipment 421 so that they will be able to properly control the demodulation equipment 721.

In order to properly function, the decoding equipment must in some manner be synchronized with the received signals. In order to accomplish the required synchronization a multivibrator tube 613 is provided which is connected to the synchronizing channel 430 so that this multivibrator will operate under control of the synchronizing signal or signals.

Multivibrator tube 613 may operate at the same frequency as the synchronizing signals or at some submultiple thereof. The output of the multivibrator tube 613 is coupled through a variable condenser 615 to a limiting and shaping amplifier comprising tubes 614, 616, 617 and 618. The variable condenser 615 is provided so that the length of the synchronizing pulse may be controlled and adjusted without in any way affecting the frequency in the multivibrator tube 613. The output of tube 618 is a positive pulse which is supplied to the grid of tube 910.

Normally tube 910 is nonconducting. However, upon the application of a positive pulse to its grid or input circuit current flows in the anode-cathode circuit of tube 910 and causes condenser 911 to be charged. At the termination of a positive pulse applied to the grid of tube 910, tube 910 will cease to conduct current and condenser 911 will start to discharge through the inductance 919 which forms a resonant oscillating circuit with condenser 911. The frequency of the oscillatory circuit comprising condenser 911 and inductance 919 should be of a pulse frequency so that one complete oscillation is obtained for each pulse interval.

The frequency of the multivibrator 613 will usually be the frequency at which complete code combinations are received but need not be of this frequency so long as it will accurately control the frequency of the oscillating circuit comprising condenser 911 and inductance 919.

The oscillatory circuit is connected to the input circuit of an amplifier comprising tubes 912, 913 and 914 which clip and otherwise shape the oscillations so that a substantially square output wave form is obtained. Tube 914 provides two independent output circuits for controlling the system as will be described hereinafter.

The enciphered signals as received from transmission path 427 are first amplified by tubes 610 and 611 which may also clip and otherwise shape the received pulses. Tube 612 operates as a so-called gating tube for selecting the desired portion of each of the received pulses. The received pulses as amplified and shaped by amplifier tubes 610 and 611 are applied to the control grid of tube 612. The suppressor grid of tube 612 is supplied with positive pulses from the output of the right-hand section of tube 914. Tube 612 is so biased that no current flows in its output circuit unless positive pulses are simultaneously applied to both its control grid and to its suppressor grid. Thus, only that portion of the received pulses applied to its control grid during the time gating pulses are also applied to the suppressor grid is transmitted to the output circuit of this tube.

The received pulses after they have been properly shaped and amplified are applied to the control grid of tube 710 where they cause positive pulses in the output circuit of this tube. The positive pulses are then applied to the control grid of the left-hand section of tube 713. The pulses are amplified by this section of tube 713 and inverted in its output circuit where they appear as negative pulses. These pulses are in turn applied through the coupling network 714 to the cathode of the right-hand section of the double diode 717. These pulses are transmitted through the right-hand section of this tube and through the coupling network 719 to the input circuit of the left-hand section of tube 720. The pulses are also applied to the input circuit of the right-hand section of tube 720. The output of the right-hand section of tube 720 is connected to the pulse demodulation equipment 721 which in turn is connected to the terminating equipment 722 and receiving device 723.

The output circuit of the left-hand section of tube 720 is coupled to the input of the amplifier tube 810. The output of tube 810 is in turn connected to both sections of tube 811 which provides two independent outputs. The output of the left-hand section of tube 811 is connected through the variable delay device 812 to the suppressor grid of a modulating tube 813. The control grid of tube 813 is supplied with high frequency carrier current developed by the oscillator tubes 816 and 817, the frequency of which is controlled by the mechanical resonator 819 which usually is in the form of a quartz piezoelectric crystal.

Consequently, the output of tube 813 comprises a high frequency carrier current which in an exemplary embodiment of the invention may be of the order of ten megacycles modulated in accordance with the pulses received from the output circuit of the left-hand section of tube 720. These pulses are amplified by the amplifier tube 814 and then transmitted through delay network 805, to the additional amplifier tubes 724 and 725. All of the amplifier tubes 814, 724 and 725 in addition to amplifying the modulated carrier current to compensate for the loss in the delay network 805, may also be employed to shape and otherwise control the pulses to compensate for distortion introduced in the delay network or in other places in the system.

The delay network 805 is designed to have substantially the same delay interval as the delay network 505 at the transmitting station. If these delay networks are arranged to be adjustable, then the delay network 805 should be adjustable to have substantially the same delay intervals as the delay network 505. The delay of network 805 may be, for example, readily changed by crank 806 which may be similar in operation to crank 506.

The coupling between the high frequency amplifier tubes includes inductances 815, 726 and 728 which are employed to neutralize in part the capacity of the elements of the respective vacuum tubes as well as the distributed or stray capacity of the wiring between the various elements.

The output of the amplifier tube 725 is coupled to the rectifier or demodulating diode 727 which causes a negative pulse to be applied to the control grid of the tube 729 in response to each pulse of carirer currents.

Due to the action of the double diode tube 717 negative pulses of current or voltage are applied to the grid of tubes 720. This means that either negative pulses or no pulses appear across the output cathode resistances of both sections of this tube since each section of this tube acts as a cathode follower and does not invert the phase of the signals passing through it. The pulses of negative current from the lefthand section are then inverted by tube 810 where they are applied as positive pulses to the control grids of tube 811. These pulses are not inverted by tube 811 but appear as positive pulses across the cathode resistors of this tube because both sections of this tube operate as cathode followers. The positive pulses from the lefthand section after being delayed by the delay network 812 modulate the carrier wave in tube 813 and cause pulses of high frequency current to be transmitted through the amplifier tube 814, delay network 805, amplifier tubes 724 and 725 to demodulator tube 727. Due to the actions of demodulator tube 727 pulses of carrier current are converted to negative pulses as applied to the control grid of tube 729.

The received pulses are applied as positive pulses to the control grid of the left-hand section of tube 713 and in the absence of any pulses applied to the control grid of the right-hand section of this tube, such received pulses are transmitted through network 714 and the righthand section of tube 717 to the left-hand grid of tube 720 where they appear as negative pulses. These pulses are then transmitted around the delay network to the control grid of tube 729 where they again appear as negative pulses after being delayed by the combined delay intervals of the delay networks 805 and 812.

Tube 729 acts as a cathode follower tube so that negative pulses are applied through the coupling network 730 to the right-hand section of tube 713.

Upon the application of a negative pulse to the grid of the right-hand section of tube 713 and in the absence of the application of a positive pulse to the left-hand grid of this tube, a positive pulse will be generated in the output circuit of tube 713. It should be noted that both sections of tube 713 have a common output resistor 731. Positive pulses appearing in the output circuit of tube 713 are transmitted through the coupling network 715 to the input circuit of tube 716. These pulses are inverted by tube 716 and transmitted as negative pulses through the coupling network 718 and the left-hand section of tube 717 to the grid of tube 720 through the coupling network 719.

Thus if a single positive pulse is received and applied to the grid of the left-hand section of tube 713, this pulse will be transmitted first to the pulse code demodulation equipment 721 and also through the delay network to the right-hand grid of tube 713 where it appears as a negative pulse. This negative pulse will likewise be transmitted through both sections of tube 720 to the pulse code demodulating equipment 721 and also again transmitted around delay network. The above action continues so long as no additional positive pulses are received and applied to the left-hand grid of tube 713 at the same time that the negative pulses are applied to the right-hand grid of this tube.

Upon the application of a positive pulse to the left-hand grid of tube 713 simuletaneously with the application of a negative pulse to the right-hand grid of this tube, no pulse or a pulse of no current will appear in the output circuit of tube 713. In other words, the magnitudes of the positive and negative pulses applied to the respective grids of tubes 713 are so adjusted that they cancel or neutralize each other in the output circuit of tube 713, that is, the common anode resistor 731. In this manner the pulse which was started circulating around the delay network is cancelled and the system restored to its original condition.

As explained hereinbefore if the delay network 805 has a delay interval of several pulse intervals then as many pulses may be circulating around the delay circuit as the number of delay intervals by which the delay network 805 delays these pulses. Each of the pulses is started in this delay loop by the reception of a pulse from the distant end and each one of them is stopped by the reception of another pulse from the distant end after some multiple of the delay interval around the delay loop. In this manner, the pulse code modulation signals or pulses similar to those received from the pulse code modulation equipment 412 are regenerated and applied to the pulse code demodulating equipment 721 at the receiving terminal.

As pointed out above the pulse may be started around the delay path and containue to be transmitted around the delay path for an appreciable interval of time. If the delay interval around the delay path departs only slightly from the desired number of integer pulse intervals the departure will be added or subtracted upon each trip around the delay loop. If, for example, the delay interval is only one one-hundredth longer than the shortest interval between pulses then after one hundred times around the delay loop the pulse will have been delayed not one hundred pulse intervals but one hundred and one pulse intervals. Thus it has become delayed a whole pulse interval longer than it should have been delayed. Of course, a much shorter delay interval, that is, much less than a whole pulse interval of excessive delay will cause trouble and improper operation of the system. In an effort to correct the delay interval, an automatically adjustable auxiliary delay network 812 has been provided. In addition, control means have been provided for automatically changing the delay of this auxiliary network.

Figure 8:
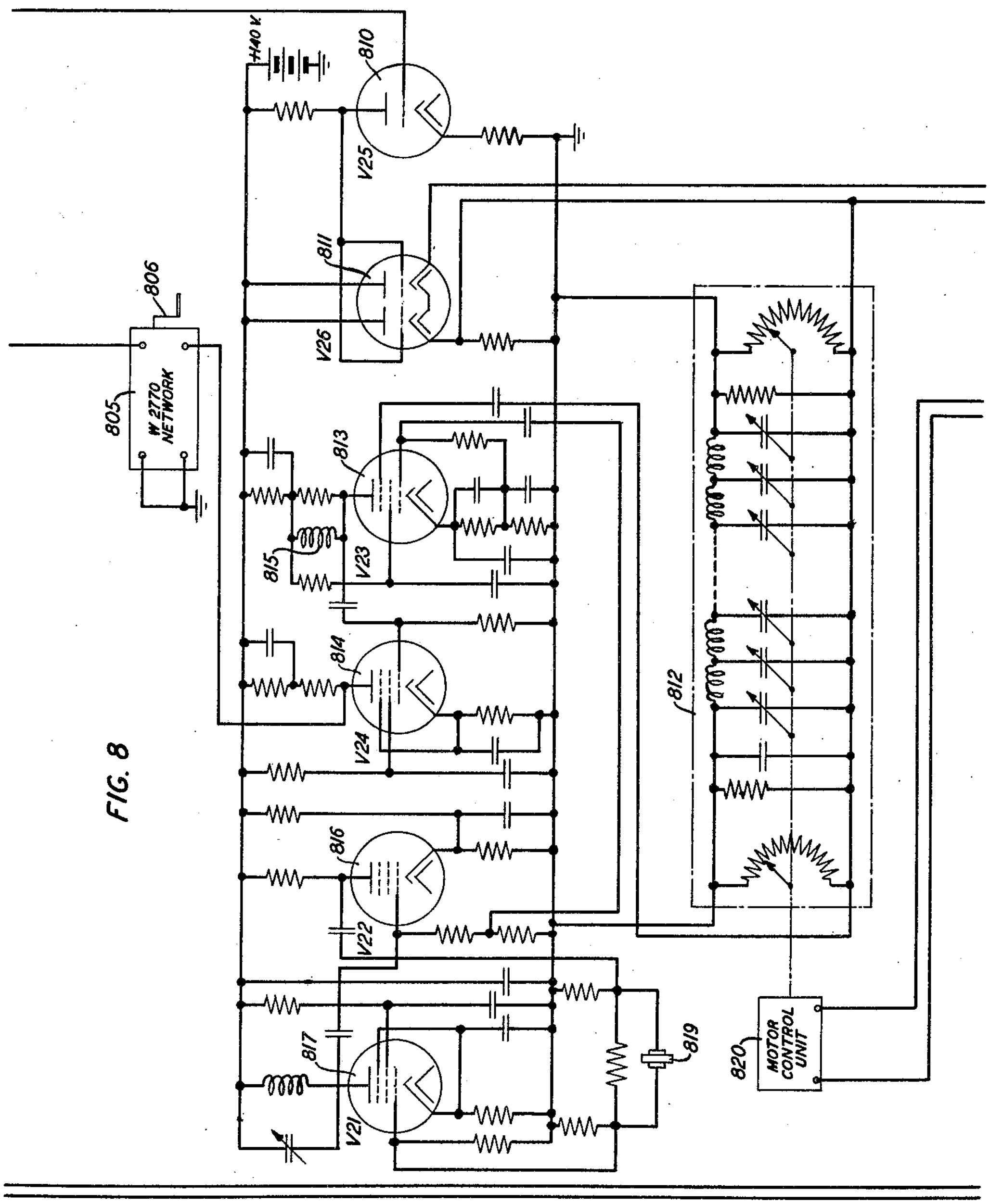
Figure 9:
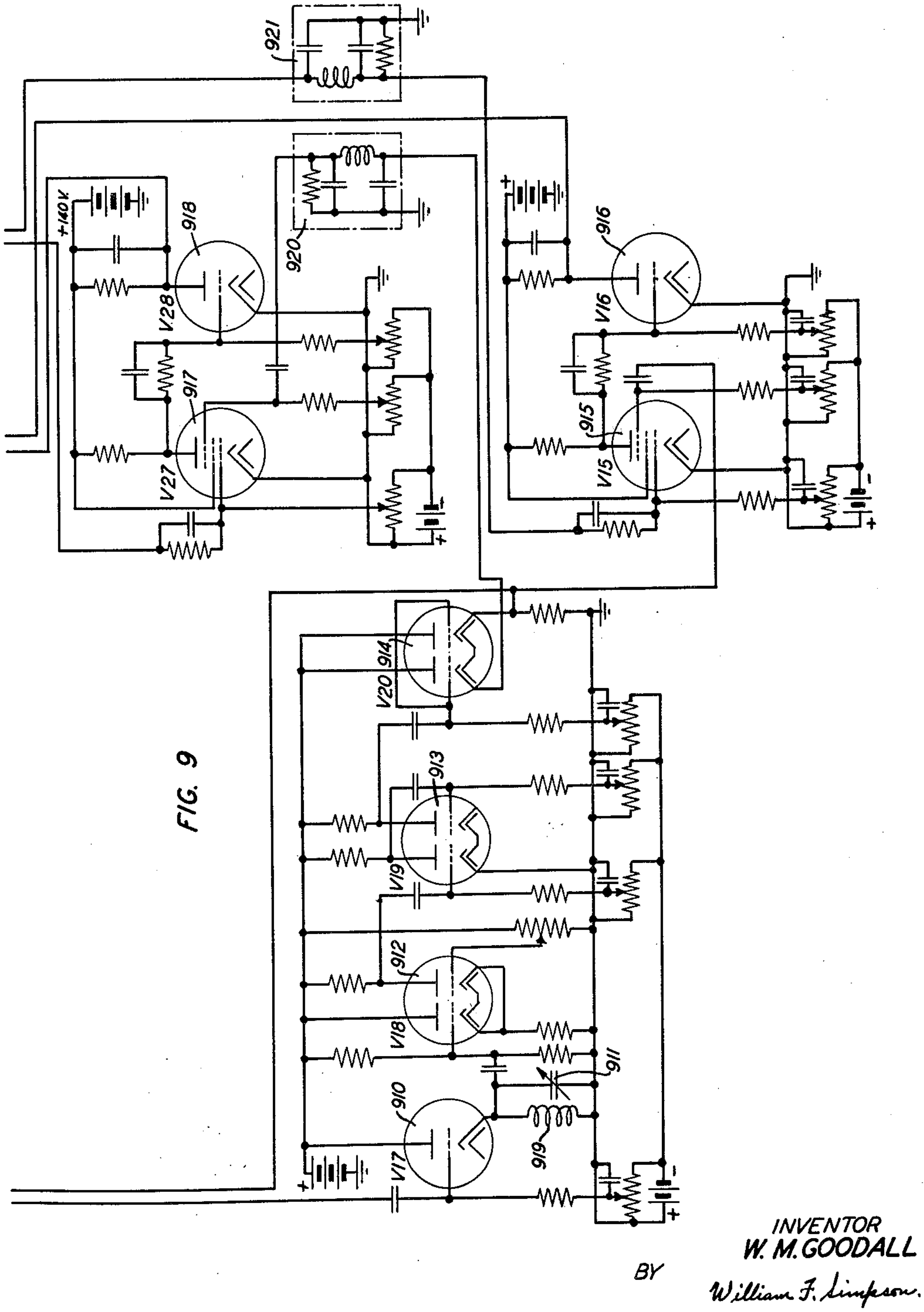

As shown in FIG. 8 the delay network 812 comprises a delay line or multielement network comprising inductance elements and capacity elements. The capacity elements are shown as variable and are varied by means of a common shaft which in turn is controlled by the motor control unit 820. The condensers may be mounted directly on the shaft of the control motor or they may be geared to it or driven from it in any other suitable manner. By changing the capacity of the condensers and the delay interval of the delay network may be varied. However, upon changing its capacity the characteristic or surge impedance of the line or network also changes by a small amount. In order to compensate for the changes in the characteristic impedance in the network a portion at least of the terminal impedances at the two ends of the network is made variable and controlled from the same motor shaft, or from the same motor and motor control equipment at least, as controls the capacity of the condensers. In this manner the terminal impedances may be varied at the same time the capacity is varied so that the terminal impedances will substantially match the impedance of the line throughout the working range of the device.

The motor control unit is controlled from two pairs of vacuum tubes 917, 918 and 915, 916. The signals as applied to the delay network by tube 811 are also applied to the two pairs of tubes pointed out above. In addition to the signals applied to the control networks, the output of the code element timing generator comprising tubes 910, 912, 913 and 914 is also applied to the two pairs of tubes pointed out above.

The pulses from the left-hand section of tube 811 are applied directly to the control grid of tube 917. In addition pulses from the right-hand section of tube 811 are transmitted through a subsidiary delay network 921 to the control grid of tube 915. Code element timing pulses are applied from the right-hand section of tube 914 directly to the suppressor grid, that is, another control element, of tube 915. The output of the left-hand section of tube 914 is transmitted through the subsidiary delay network 920 to the suppressor grid of tube 917. Thus in the case of the upper pair of tubes 917 and 918, the signaling pulses are applied directly to the control grid of tube 917 while the synchronizing pulses are delayed and then applied to the suppressor grid. In the case of tubes 915 and 916, however, signal pulses are first delayed and then applied to the control grid of tube 915 while the synchronizing pulses, that is, the code element timing pulses, are applied to the suppressor grid without any delay.

The delay networks 920 and 921 are substantially the same and in the exemplary embodiment of the invention described herein cause the respective pulses applied to them to be delayed by approximately one-half of a pulse length or one-half of a pulse interval.

Tubes 915 and 917 are normally biased so that little or substantially no current flows in their anode circuits unless pulses are simultaneously applied to both their control grids and suppressor grids.

If it is first assumed that the signaling pulses and synchronizing pulses are in proper time relationship one with another, that is, they both coincide accurately in time, then tubes 917 and 915 both pass current during substantially the same half pulse interval. The output of tube 917 is amplified by tube 918 while the output of tube 915 is amplified by tube 916. The amplified outputs of tubes 918 and 916 are employed to control the motor control equipment described above.

So long as the output of the two tubes 916 and 918 remains substantially the same as assumed above, each will cancel the effect of the other upon the motor control unit and thus cause no correction or change in the delay network 812.

If it is now assumed that the delay interval around the delay loop is slightly longer than the interval between the synchronizing pulses from the code element timing circuit, then the pulses after being transmitted around the delay loop are delayed by progressively longer and longer intervals of time. In other words, the signaling pulses arrive at tube 811 later and later relative to the synchronizing pulses. As a result tube 917 tends to conduct for a greater and greater interval of time until the signal pulses are delayed by a half pulse interval at which time tube 917 will conduct current during the entire pulse interval during which signaling pulses are received. However, tube 915 will conduct less and less current as the delay of the signaling pulses increases until it will conduct no current when the signaling pulses become delayed a whole half pulse interval.

However, long before the pulses become delayed by a time interval even approaching half a pulse interval, the unbalance between the output of tubes 917 and 915 and thus 918 and 916, will cause the motor control equipment or unit to decrease the delay interval of the delay device 812 and thus tend to restore the system to the condition where the signalling pulses and the synchronizing pulses both occur at substantially the same instances of time.

If it is assumed that the delay interval around the delay loop is slightly shorter than the interval between the synchronizing pulses the signalling pulses will arrive at tube 811 at progressively earlier instances of time. Under these circumstances the output of tube 917 decreases while the output of tube 915 increases. These outputs are in turn amplified and applied to the motor control equipment in such a manner as to cause the delay interval around the delay loop to be slightly increased thus tending to make the delay interval around the loop substantially equal to the interval of time between successive pulses.

It should be noted that in case certain of the signalling pulses are omitted as they will be in accordance with the selected code, the operation of the comparing mechanism is suspended for that cycle of operation and then later resumed when and if additional signalling pulses are received without causing any change in the delay interval around the delay path. In this manner slight variations in the transmit time around the delay loop may be eliminated and the system satisfactorily operated for longer periods of time during which no or only an occasional pulse or group of pulses are received.

Of course, the delay device 812 may be similar to the delay device 805 in that it may comprise supersonic delay devices instead of the delay line 812. In this case the delay interval may be readily adjusted or changed by causing motor 820 to rotate an element similar to crank 806 which will change the length of the transmisssion path between the transmitting and receiving elements of the supersonic delay device.

Furthermore, other types of delay networks may be employed in place of the electrical delay network represented by the delay device 812 in the drawing.

The motor control unit may include any desired number of relays and other control equipment. It also includes either (1) a reversible motor or (2) two motors, one of which is capable of running in one direction and the other capable of running in the reverse direction. These motors may either be operated by means of alternating currents or direct currents as is well understood by persons skilled in the art. Furthermore, suitable relay devices and apparatus may be connected in the output circuits of tubes 918 and 916 and these relays in turn control the operation of the motor units.

In certain cases at least, it may be desirable and feasible to operate the motors directly from the output circuits of tubes 918 and 916. As will be readily understood by persons skilled in the art, such modifications may be readily made and the system work in the manner described.

When desired the signals at the transmitting station or at any suitable intermediate point may again be transmitted through additional apparatus and equipment similar to that shown in FIG. 1. The delay loop of this additional equipment may have the same or a different delay interval. When such additional equipment is employed at the transmitter or at any intermediate point, additional equipment will be employed at the receiver or at any other suitable intermediate point to restore the received pulses to their original form. Thus the signals may in effect be differentiated at the transmitting station or at any intermediate point or points as often as desired providing suitable integration equipment is also provided to restore the pulses or signals to their original form.

What is claimed is:

1. In a system for communication by means of on-and-off pulses having a fixed recurrent rate, a gating circuit comprising two inputs and one output and means for producing a pulse in said output in response to a pulse impressed on one of said inputs only, a source of on-and-off signal pulses of fixed recurrence rate in permutation code groups each representative of a sample of the message wave, connections from said source to one of said inputs of said gating circuit, a delay circuit producing a delay equal to an integral number of pulse intervals, and connections from said source to the other of said inputs of said gating circuit through said delay circuit to supply to said other of said inputs, pulses delayed with respect to those supplied to said one of said inputs.

2. In a communication system, a source of a sequence of on-off pulses in permutation code groups representative of the message wave, a first delay device producing a delay equal to an integral number of pulse intervals, connections for supplying such permutation code groups of on-off pulses to said delay device, and a gating circuit comprising one input circuit connected to receive the input to said delay device, a second input circuit connected to the output of said delay device, an output circuit, means for producing an on pulse in said output circuit in response to an on pulse in one of said input circuits only and means for producing an off pulse in response to simultaneous on pulses in said two input circuits.

3. In a communication system according to claim 2, a receiver for the pulses from the output circuit of said gating circuit comprising a receiving gating circuit comprising a first input circuit connected to receive the pulses from the output of the first gating circuit, a second input circuit, an output circuit, means for producing an on pulse in said output circuit in response to an on pulse in one of said input circuits only and means for producing an off pulse in response to simultaneous on pulses in said input circuits, a receiving delay device producing a delay equal to that of the first delay device and connected to receive pulses from the output circuit of said receiving gating device, and connections for supplying the output of said receiving delay device to the second input circuit of said receiving gating circuit.

4. In a communication system a source of on-off pulses in permutation code groups representative of the message wave and ciphered by the reentrant addition of the sequence of pulses with the same sequence delayed by a predetermined integral number of pulse intervals, a system for deciphering the resultant ciphered sequence of pulses comprising a gating circuit comprising a first input circuit connected to receive the pulses from the output of the ciphering circuit, a second input circuit, an output circuit, means for producing an on pulse in said output circuit in response to an on pulse in one of said input circuits only and means for producing an off pulse in said output circuit in response to simultaneous on pulses in said two input circuits, a delay device producing a delay equal to said predetermined integral number of pulse intervals and connected to receive pulses from said output circuit, and connections for supplying the output of said receiving delay device to said second input circuit.

5. In a communication system a source of on-off signal pulses in permutation code groups each representative of a sample of the message wave, a delay circuit connected to receive pulses from said source and producing a delay equal to an integral number of pulse intervals, a pair of electronic tubes each having a grid, an anode and a cathode, a cathode resistor common to said tubes, means for so biasing said tubes that in the absence of signals to the grids both tubes are conducting with one tube conducting a substantially higher anode-cathode current than the other, an output circuit connected to the anode of said one tube, and connections for supplying the input pulses to said delay circuit to the grid of said one tube and the output pulses from said delay circuit to the grid of the other of said tubes.

6. In a communication system a source of on-off signal pulses in permutation code groups each representative of a sample of the message wave, a delay circuit connected to receive pulses from said source, a pair of electronic tubes each having a grid, an anode and a cathode, a resistor common to the grid cathode and anode-cathode circuits of the two tubes, means for so biasing the grids of said tubes that in the absence of signal voltages to either grid, one of said tubes carries an anode-cathode current equal to approximately one-half its saturation current and the other of said tubes carries a lower anode-cathode current, connections for supplying the input pulses to said delay circuit to the grid of one of said tubes and the output pulses from said delay circuit to the grid of the other of said tubes, and output connections from the anode of said one of said tubes.

7. In combination according to claim 6 in which said output connections include two parallel branches and one branch comprises a phase inverter circuit.

References Cited in the file of this patent

UNITED STATES PATENTS

| | | |
|---|---|---|
| 1,796,030 | Kell | Mar. 10, 1931 |
| 2,199,634 | Koch | May 7, 1940 |
| 2,202,605 | Schroter | May 28, 1940 |
| 2,266,401 | Reeves | Dec. 16, 1941 |
| 2,272,070 | Reeves | Feb. 3, 1942 |
| 2,321,611 | Moynihan | June 15, 1943 |
| 2,338,395 | Bartelink | Jan. 4, 1944 |
| 2,391,776 | Fredendall | Dec. 25, 1945 |
| 2,404,356 | Atkins | July 23, 1946 |
| 2,412,974 | Deloraine | Dec. 24, 1946 |
| 2,421,340 | Levy | May 27, 1947 |
| 2,427,687 | Norgaard | Sept. 23, 1947 |
| 2,438,908 | Goodall | Apr. 6, 1948 |
| 2,446,613 | Shapiro | Aug. 10, 1948 |
| 2,449,819 | Purington | Sept. 21, 1948 |
| 2,482,544 | Jacobsen | Sept. 20, 1949 |